April 30, 1940. V. M. TAYLOR 2,199,325
DRESSING DEVICE FOR SAW TEETH
Original Filed July 19, 1938 2 Sheets-Sheet 1
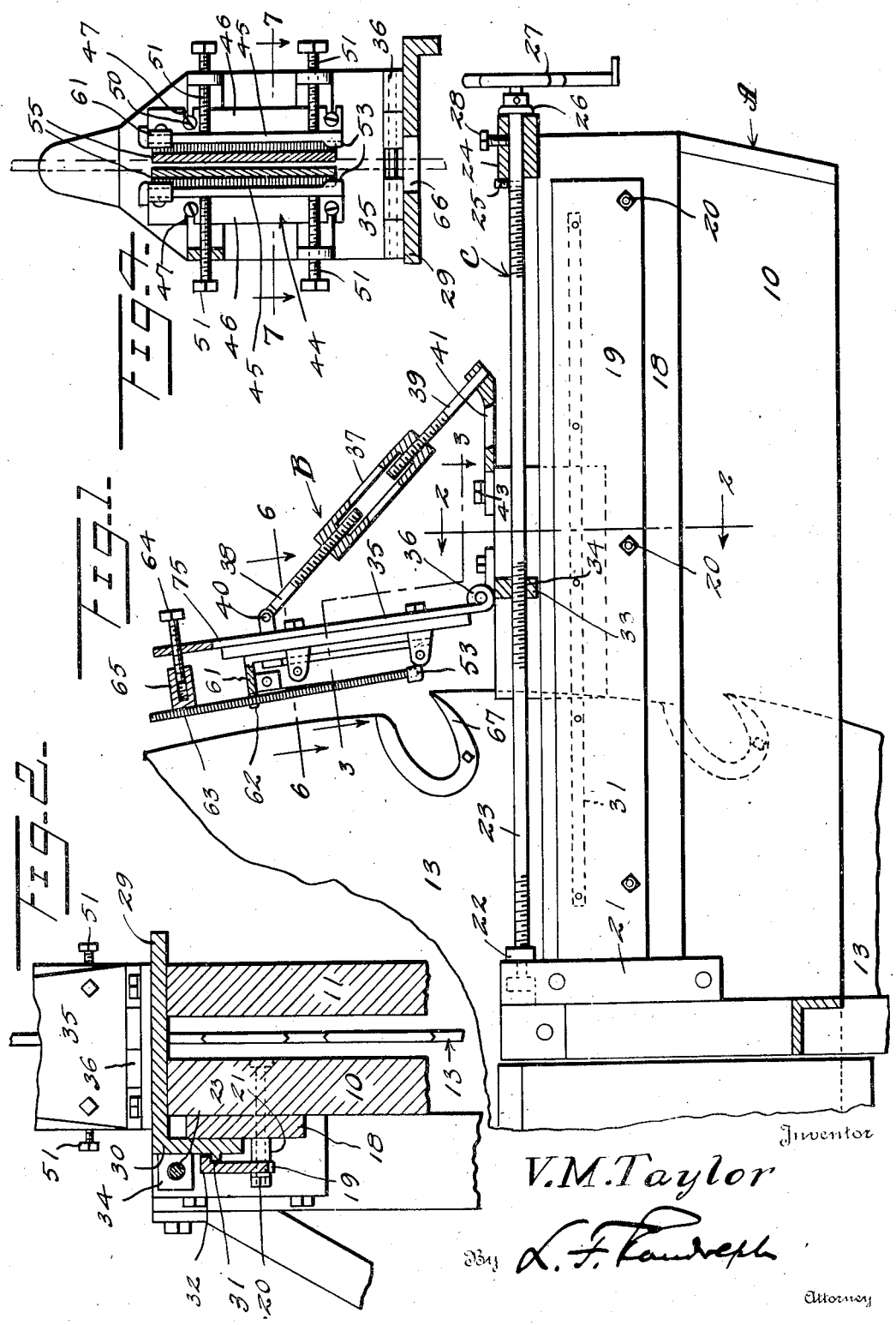
Inventor
V. M. Taylor
By L. F. Landreth
Attorney

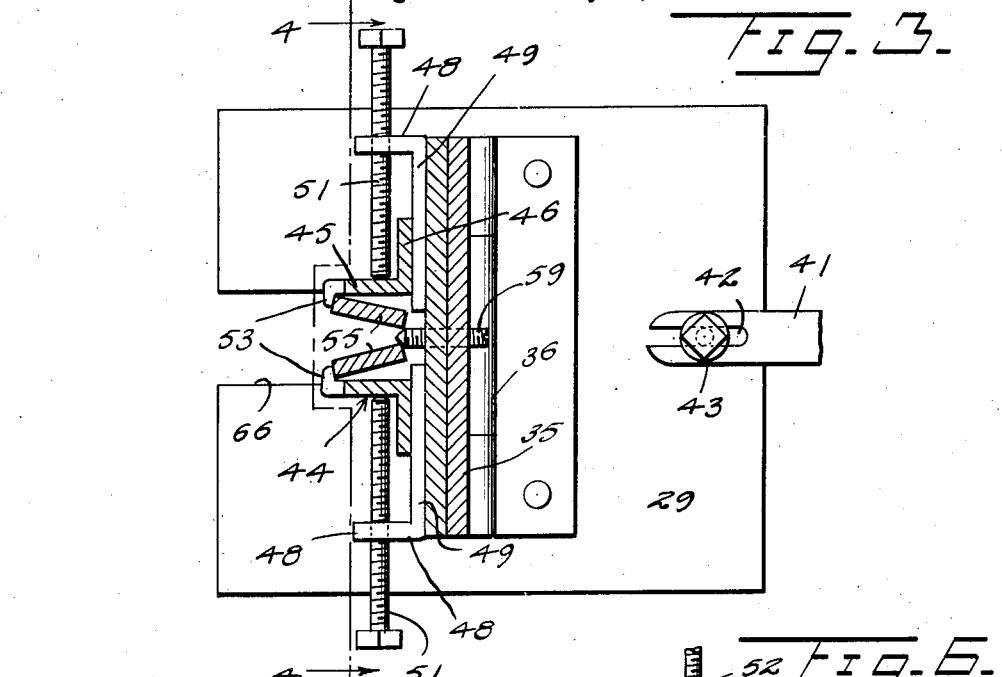
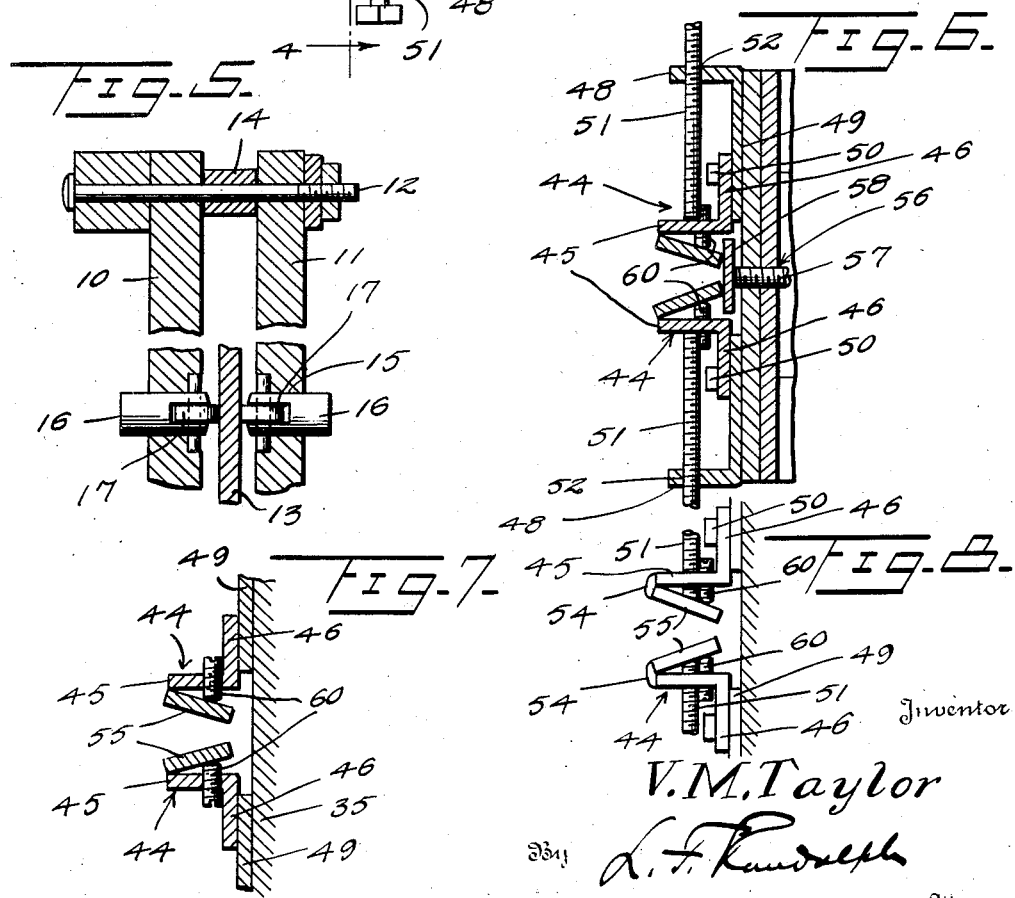

Patented Apr. 30, 1940

2,199,325

UNITED STATES PATENT OFFICE 2,199,325

DRESSING DEVICE FOR SAW TEETH

Victor Mitchell Taylor, Tazewell, Va.

Original application July 19, 1938, Serial No. 220,103. Divided and this application June 8, 1939, Serial No. 278,137

6 Claims. (Cl. 76—48)

This invention relates to an improved apparatus for use in dressing the teeth of a circular saw before the teeth have been sharpened.

This invention constitutes a division of my co-pending application entitled Device for filing circular saws, filed July 19, 1938, Serial No. 220,103.

It is a particular aim of this invention to provide a device for dressing the saw teeth of a circular saw, before sharpening, so that the width and length of each tooth will be uniform, and more particularly to provide a dressing apparatus particularly designed and adapted for use in conjunction with my device for filing circular saws, heretofore referred to.

It is a further aim of this invention to provide a dressing device for circular saw teeth including a frame for removably and rotatably mounting a circular saw whereby the dressing operation may be accomplished while the saw is rotating.

A particular advantage of the invention resides in the fact that by dressing the saw teeth to the same length and width reduces to a minimum the danger of the teeth being broken while engaged in cutting, which is frequently caused by the teeth being of different lengths and widths so that a tooth that is longer or wider than the remaining teeth of a circular saw will engage a kerf that is either too shallow or too narrow to receive the tooth normally so that frequently the tooth is unable to make a cut sufficiently deep and wide to permit it to pass through the kerf and is thus broken off requiring replacement. On the other hand, where certain of the teeth are longer or wider than the other teeth, the larger teeth perform all of the cutting operation resulting in uneven rotating speed of the blade and a fluctuating load on the power operating the blade.

Other objects and advantages of the invention will hereinafter become more fully apparent from the following description of the drawings, which illustrate a preferred embodiment thereof, and wherein—

Figure 1 is a side elevational view, partly in section, of the dressing and jointing apparatus, Figure 2 is a transverse vertical sectional view taken along the line 2—2 of Figure 1, Figure 3 is an enlarged horizontal sectional view taken along the line 3—3 of Figure 1, Figure 4 is a reduced transverse vertical sectional view taken along the line 4—4 of Figure 3, Figure 5 is a fragmentary longitudinal sectional view of a portion of the frame showing the guide means for truing the saw during rotation, Figure 6 is an enlarged horizontal sectional view taken along the line 6—6 of Figure 1, Figure 7 is a horizontal sectional view taken along the line 7—7 of Figure 4, and Figure 8 is a top plan view of the follower members and of a pair of files disposed therebetween.

Referring more particularly to the drawings, wherein like reference characters designate like or corresponding parts throughout the different views, this invention includes generally the combination of a blade supporting frame, designated generally A, the dressing and jointing mechanism B, and a conveyor C.

The frame A is fully illustrated and described in my co-pending application, heretofore referred to, and therefore only certain parts of the frame A will be described and illustrated in this application. The frame A includes the spaced horizontal beams 10 and 11, the latter of which is removable by means of a plurality of fastenings 12, as seen in Figure 5. A circular saw blade, designated generally 13, is adapted to be rotatably mounted between the beams 10 and 11 and may be applied to or removed from the frame A by removing the beam 11. Beams 10 and 11 are held in spaced apart relationship relatively to each other by means of a plurality of spacing sleeves 14 which are carried by the fastenings 12 and disposed between the beams 10 and 11 as seen in Figure 5. The beams 10 and 11 at a plurality of points are provided with aligned openings 15 in which are removably mounted the sleeves 16 carrying the guide rollers 17 which engage opposite sides of the saw blade 13 for truing it during rotation.

As best seen in Figures 1 and 2, frame A adjacent one end thereof is provided with a pair of plates 18 and 19 which are secured longitudinally thereof and on the outer side of the beam 11 by means of the fastenings 20. Plate 19 is disposed on the outer side of the plate 18 and is spaced therefrom by means of the spacing sleeve 21, carried by the fastenings 20.

An arm 21 is secured to the outer side of the beam 10 at the inner ends of the plates 18 and 19 and has its upper end projecting above the beam 10. The upper free end of the arm 21 is provided with a bearing 22 forming a part of the conveyor C and adapted to form a journal for one end of the threaded rod 23. A bearing 24 journals the rod 23 adjacent its opposite end and a pin 25 and collar 26 secured to rod 23 and engaging the ends of the bearing 24 prevent longitudinal movement of the rod relatively to its bearings 22 and 24. A crank 27 is fixed to the last mentioned end of the rod 23 for rotating it, and a set screw 28 is mounted in a threaded opening in the bearing 24 and is adapted to be moved into clamping engagement with the rod 23 for fixing the conveyor C in adjusted position, as will hereinafter be described.

The dressing and jointing mechanism B includes a carriage comprising a plate 29 having a downturned flange 30 provided with a longitudinally disposed outwardly projecting rib 31. Plate 29 is adapted to be slidably mounted on the upper edges of the beams 10 and 11 with the flange 30 depending downwardly along the outer side of the beam 10 and between the plates 18 and 19. Plate 19 is provided with an inwardly projecting flange 32 at its upper edge to overlie the rib 31 to hold the flange 30 in engagement with the plates 18 and 19 and the plate 29 in position on the beams 10 and 11. A lug 33 extends outwardly from the flange 30 and is provided with a threaded bore 34 through which extends the rod 23 and with which the rod 23 is in threaded engagement, for reciprocating plate 29 longitudinally of the frame A by operation of the crank 27.

A plate 35 is hinged at 36 to the plate 29, intermediate of its ends, and transversely thereof. A turnbuckle 37 is adjustably connected to the threaded rods 38 and 39, the former of which is pivotally connected by means of the lug 40 to the back of the plate 35, adjacent its free end. The free end of the rod 39 is secured to one end of a supporting member 41 the opposite end of which is provided with a slot 42 which is adapted to be adjustably and removably connected to the back end of the plate 29 by a headed screw fastening 43, as best seen in Figure 3.

A pair of corresponding follower members 44 are mounted longitudinally of the forward side of the plate 35, as best seen in Figure 4. Follower members 44 each comprise a side 45 and a side 46 which are disposed at right angles to each other. Sides 46 are provided with the transverse slots 47 which open outwardly of their free edges, as best seen in Figure 4. A pair of lugs 48 project forwardly from each of the longitudinal edges of the plate 35 and are provided with the angularly disposed base portions 49 which are mounted transversely of the forward side of the plate 35 and which are secured thereto by means of the fastenings 50. Sides 46 of the followers 44 engage the base portions 49 of the lugs 48 and are held in position thereon by means of the fastenings 50 engaging the slots 47. The headed fastenings 50 loosely mount the followers 44 for movement transversely of the plate 35.

Set screws 51 are adjustably mounted in threaded openings 52 of the lugs 48 and are disposed with their inner adjacent ends engaging the remote faces of the sides 45 for moving the followers 44 inwardly relatively to each other. As best seen in Figures 3 and 8, the longitudinal free edges of the sides 45 are provided adjacent their lower ends with the outwardly and inwardly projecting claws 53 and adjacent their upper ends with the inwardly extending claws 54 which are adapted to engage corresponding longitudinal edges of a pair of files 55. Files 55 are urged outwardly and into engagement with the pairs of claws 53 and 54 by means of a follower 56 comprising a screw 57 which is mounted in a threaded opening in the plate 35 and which is provided at its inner end with a plate 58 which engages the inner longitudinal edges of the files 55 adjacent their tops, as best seen in Figure 6; and by means of a set screw 59 which likewise engages a threaded opening in the plate 35 and which is disposed between and against the inner longitudinal edges of the files 55 adjacent their bottoms. As seen in Figure 3, set screw 59 tends to urge the inner edges of the files 55 outwardly of each other, for a purpose which will hereinafter be described. As best seen in Figures 6, 7 and 8 a plurality of set screws 60 are mounted in threaded openings in the sides 45 for engaging the remote sides of the files 55 and are adjustable relatively to sides 45 for swinging the inner longitudinal edges of the files inwardly of each other to angularly adjust them as desired, after which the set screw 59 is moved in the position as seen in Figure 3, to clamp the files in adjusted position. Files 55 are ordinarily canted at about an angle as seen in Figures 3, 6, 7 and 8 for a purpose which will hereinafter be described.

As best seen in Figure 1, a bar 61 is mounted on the upper edge of each of the sides 45 and have their corresponding ends extending outwardly beyond the sides 45 and provided with inwardly opening notches 62 which are adapted to receive the longitudinal edges of a file 63, the lower end of which rests on the lower claws 53. A set screw 64 is adjustably mounted in a threaded opening adjacent the top of the plate 35 and is provided with a head or socket 65 for engaging the file 63 adjacent its upper end, to urge said end outwardly to hold the opposite end inwardly and in clamping engagement with the claws 53. File 63 is disposed in a plane substantially parallel to the plane of the plate 35, as seen in Figure 1.

As best seen in Figure 4, carrier plate 29 is provided with a slot 66 which extends from adjacent the hinge 36 forwardly through the forward edge of the plate 29 and which is disposed centrally thereof and beneath the followers 44.

From the foregoing it will be seen, that by operating crank 27 carrier plate 29 can be moved forwardly or rearwardly of the frame A to position a portion of the periphery of the circular saw 13 in its slot 66. Crank 27 is adjusted until one of the removable saw teeth 67 of the saw 13 is in contact with the file 63 after which set screw 28 is tightened to clamp the follower plate 29 in adjusted position and the turnbuckle 37 is then adjusted to angularly adjust the plate 35 and file 63 to the desired angle. Saw 13 is then revolved in the frame A in a clockwise direction, as seen in Figure 1, so that the direction of movement of the saw 13 is opposite to its normal direction of movement for cutting. By thus revolving the saw 13 the back edge of each of the teeth 37 will be dressed to substantially the same length, after which set screw 28 is loosened and the crank 27 moved to advance the file 63 slightly. The operation of revolving the saw 13 is then repeated to insure dressing the back edges of each of the teeth 67 to the same length. Set screw 64 is then retracted to release file 63 which is removed, after which conveyor C is actuated to advance the follower plate 29 to position one of the teeth 67 between the files 55, which are adjusted as heretofore described to any angle desired by operation of the set screw 60 and set screw 59. The saw 13 is again revolved in a reverse direction to cause the sides of the teeth 67 to be dressed to a uniform thickness and the followers 44 may be moved inwardly by turning set screws 51 and slightly loosening screw 59, during this operation, to insure that both sides of each tooth 67 will be dressed. In this way, each tooth 67 is dressed and jointed to a uniform width and length.

As heretofore mentioned, the dressing and jointing mechanism constitutes the final step of sharpening teeth of a circular saw and is adapted to be used in conjunction with a sharpening apparatus, especially the apparatus disclosed in my co-pending application, heretofore referred to.

Various modifications and changes in the construction and arrangement of the parts forming the invention are contemplated and may be resorted to and the right is reserved to make such variations as do not depart from the spirit and scope of the invention as hereinafter defined by the appended claims.

I claim as my invention:

1. A saw tooth dressing device comprising a frame for rotatably mounting a circular saw, a carriage slidably mounted on said frame, a plate pivotally mounted on said carriage and rising therefrom, means connected to said plate and carriage for angularly adjusting the plate relatively to the carriage, claws disposed longitudinally of said plate for supporting a pair of files in opposed spaced relationship, said claws being slidably mounted laterally of said plate, means for adjustably positioning said claws relatively to each other, and means carried by said claws for engaging and angularly adjusting the files relatively to each other.

2. A device as in claim 1 comprising a follower, a screw conveyor mounted in said plate for actuating said follower, said follower engaging corresponding longitudinal edges of said files for retaining them in adjusted positions relatively to each other.

3. A saw filing apparatus comprising a carriage slidably mounted on a circular saw supporting frame, a plate pivotally connected to said carriage and rising therefrom, means connected to the carriage for angularly adjusting the plate relatively to the carriage and for retaining the plate in adjusted position, file supporting claws disposed longitudinally of said plate and slidably mounted laterally thereof, means carried by the plate for actuating said claws for adjustably positioning them relatively to each other, and file clamping means carried by said plate, and including a follower mounted therein, for co-acting with said claws.

4. In a saw filing device, a carrier having a slot in its forward end, adapted to be slidably mounted on a saw support and disposed in substantially a horizontal position, a plate hinged to said carrier intermediate of its ends and projecting upwardly therefrom, means to support and angularly adjust said plate relatively to the carrier; claws mounted longitudinally of said plate, in opposed relationship, and slidably mounted transversely thereof, set screws connected to said claws to adjustably position them relatively to each other, said claws being adapted to support files in opposed relationship to each other, and means movably mounted in said claws to engage said files to angularly adjust them relatively to each other, said files being positioned above the slot in said carrier, and being adapted to engage the teeth of a circular saw, mounted in said frame, as it is revolved, the slot forming a space through which the teeth pass after being engaged by the files.

5. A dressing device for circular saws, comprising a file supporting mechanism including a plate, followers mounted longitudinally of said plate and slidably mounted transversely thereof, said followers having inwardly projecting spaced fingers for engaging corresponding portions of files mounted in opposed relationship between said followers, said files being adapted to engage the teeth of a circular saw, set screws carried by said followers for engagement with the files to angularly adjust them relatively to each other, and means mounted in said supporting mechanism and adjustable relatively thereto for retaining the files in adjusted position.

6. In a saw filing apparatus, a frame for removably and rotatably mounting a circular saw, a carriage slidably mounted on the frame adjacent one end thereof, a screw conveyor journaled in the frame and connected to the carriage for moving it toward and away from the saw, a plate pivotally connected at one end to the carriage and rising therefrom, means pivotally connected to the plate and detachably connected to the carriage for retaining the plate in an upright position and for angularly adjusting it relatively to the carriage, angle members disposed longitudinally of said plate and slidably mounted laterally thereof, follower means carried by the plate for moving said angle members toward and away from each other, fingers carried by said angle members for removably supporting files, and means adjustably mounted in the plate for releasably clamping the files in the claws.

VICTOR M. TAYLOR.